United States Patent
Mikami et al.

(10) Patent No.: US 8,044,005 B2
(45) Date of Patent: Oct. 25, 2011

(54) LUBRICANT COMPOSITION AND SEALED BEARING THEREOF

(75) Inventors: Hidenobu Mikami, Kuwana (JP); Seiji Okamura, Kobe (JP); Hiroki Iwamatsu, Kobe (JP); Masashi Mitsuoka, Kobe (JP)

(73) Assignee: NTN Corporation, Osaka (JP)

( * ) Notice: Subject to any disclaimer, the term of this patent is extended or adjusted under 35 U.S.C. 154(b) by 1089 days.

(21) Appl. No.: 10/852,273

(22) Filed: May 24, 2004

(65) Prior Publication Data

US 2004/0242439 A1   Dec. 2, 2004

(30) Foreign Application Priority Data

May 29, 2003   (JP) ................. P2003-152181

(51) Int. Cl.
C10M 105/38 (2006.01)
C10M 115/08 (2006.01)
C10M 159/18 (2006.01)
C10M 141/10 (2006.01)
C10M 173/02 (2006.01)

(52) U.S. Cl. ........ 508/485; 508/552; 508/367; 508/162; 508/528; 508/363

(58) Field of Classification Search .............. 508/480, 508/552, 485, 162, 528, 363, 367
See application file for complete search history.

(56) References Cited

U.S. PATENT DOCUMENTS

| | | | | |
|---|---|---|---|---|
| 4,668,411 A | * | 5/1987 | Yasui et al. | 508/552 |
| 5,707,944 A | * | 1/1998 | Yokouchi et al. | 508/485 |
| 5,804,536 A | * | 9/1998 | Asao et al. | 508/100 |
| 6,329,327 B1 | * | 12/2001 | Tanaka et al. | 508/362 |
| 2002/0137639 A1 | * | 9/2002 | Asao et al. | 508/375 |

FOREIGN PATENT DOCUMENTS

| | | |
|---|---|---|
| JP | 06-306383 | 11/1994 |
| JP | 08-113793 | 5/1996 |
| JP | 09-208982 | 8/1997 |
| JP | 11-270566 | 10/1999 |
| JP | 11310787 A * | 11/1999 |
| JP | 2001-107073 | 4/2001 |
| JP | 2002-338892 | 11/2002 |

* cited by examiner

*Primary Examiner* — Glenn Caldarola
*Assistant Examiner* — Vishal Vasisth
(74) *Attorney, Agent, or Firm* — Hedman & Costigan, P.C.; James V. Costigan

(57) ABSTRACT

A rolling bearing, for use in household appliances, having a high degree of quietness, an excellent durability at high temperatures and rotational speeds, a low torque, and excellent fretting property; and a lubricant composition which can be sealed into the rolling bearing. The lubricant composition includes a base oil and a thickening agent. The base oil is a mixed oil having the following characteristics of (a) to (c): (a) The base oil consists essentially of a synthetic hydrocarbon oil and an ester oil; (b) A kinematic viscosity of the mixed oil at 40° C. is 40 to 70 mm$^2$/second; (c) A mixing weight ratio between the ester oil of the mixed oil and the synthetic hydrocarbon oil thereof is 30:70 to 70:30. The thickening agent comprises a diurea compound shown by a formula (1):

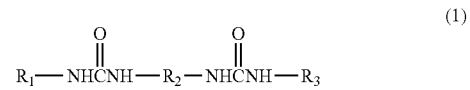

where $R_1$ and $R_3$ are a straight-chain alkyl groups having 9 to 22 carbon atoms respectively, and $R_2$ is an aromatic hydrocarbon group having 6 to 15 carbon atoms. The lubricant composition is sealed into the rolling bearing.

14 Claims, 1 Drawing Sheet

LUBRICANT COMPOSITION AND SEALED BEARING THEREOF

BACKGROUND OF THE INVENTION

The present invention relates to a lubricant composition and a sealed bearing thereof. More particularly, the present invention relates to the lubricant composition which is used by sealing it into a rolling bearing for motors for use in household appliances and apparatuses for industrial use. The rolling bearing is used at high temperatures and rotational speeds and required to have a high degree of quietness, a long life at high temperatures, a low torque, and excellent fretting property. The present invention also relates to the sealed bearing thereof.

The lubricant composition is sealed into the rolling bearing incorporated in apparatuses for industrial use and vehicles to impart lubricant property thereto. The lubricant composition is obtained by kneading a base oil, a thickening agent, and additives used as necessary. As the base oil, mineral oil and synthetic oil such as, ester oil, silicon oil, and ether oil are used. As the thickening agent, metal soap such as lithium soap and urea compounds are used. As the additives, an antioxidant, a rust preventive, a metal deactivator, and a viscosity index improver are added to the base oil as necessary.

In recent years, motor bearings which are used for household appliances and apparatuses for industrial use are rotated at high temperatures and rotational speeds. The motor bearings are demanded to have a high degree of quietness, a high durability at high temperatures and rotational speeds, a low torque, and excellent fretting property.

The lubricant composition containing the base oil including the synthetic hydrocarbon and the ester oil and the urea-containing thickening agent and additives added to the base oil is known (Japanese Patent Application Laid-Open Nos. 9-208982 and 11-270566) as lubricant compositions such as grease excellent in durability at high temperatures, restrained in the generation of noises at low temperatures, and excellent in releasability at a high temperature and a high load.

The grease composition containing the base oil consisting of the ester oil and 3 to 30 wt % of the thickening agent, essentially containing an aliphatic diurea compound, which is added to the base oil is also known as the lubricant composition having a long life in seizing when the rolling bearing is rotated at high temperatures and rotational speeds (Japanese Patent Application Laid-Open No. 2001-107073).

However, these compositions sealed into the bearing do not satisfy all the necessary lubricant characteristics of being excellent in the durability thereof at high temperatures and rotational speeds, excellent in the fretting property thereof, allowing reduction of the torque of the bearing, and allowing the generation of a quiet sound.

The ester oil is preferable as the base oil to improve the durability of the lubricant composition at high temperatures and rotational speeds. The synthetic hydrocarbon oil is preferable to improve the fretting property of the lubricant composition. As the viscosity of the lubricant composition becomes lower, the torque of the bearing decreases but the durability of the lubricant composition at high temperatures and rotational speeds deteriorates. Thus it is very difficult to obtain the lubricant composition satisfying all the above-described necessary characteristics. Therefore the lubricant composition disclosed in Japanese Patent Application Laid-Open No. 9-208982 is insufficient in its durability at high temperatures and rotational speeds. The lubricant composition disclosed in Japanese Patent Application Laid-Open No. 11-270566 causes the rolling bearing to generate big sounds.

The grease composition disclosed in Japanese Patent Application Laid-Open No. 2001-107073 is insufficient in its durability at high temperatures and rotational speeds and in its fretting property.

SUMMARY OF THE INVENTION

The present invention has been made to overcome the above-described problems. Accordingly, it is an object of the present invention to provide a lubricant composition having a high degree of quietness, an excellent durability at high temperatures and rotational speeds, allowing a bearing to have a low torque, and having excellent fretting property; and the bearing into which the lubricant composition is sealed.

To achieve the object, in a lubricant composition of the present invention including a base oil and a thickening agent, the base oil is a mixed oil having the following characteristics of (a) to (c): (a) The mixed oil consists of a synthetic hydrocarbon oil and an ester oil; (b) A kinematic viscosity of the mixed oil at 40° C. is 40 to 70 mm²/second; (c) A mixing weight ratio between the ester oil of the mixed oil and the synthetic hydrocarbon oil thereof is 30:70 to 70:30. The thickening agent comprises a diurea compound shown by a formula (1):

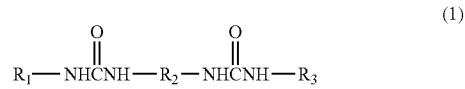

$$R_1-\text{NHCNH}-R_2-\text{NHCNH}-R_3 \quad (1)$$

where $R_1$ and $R_3$ are a straight-chain alkyl groups having 9 to 22 carbon atoms respectively, and $R_2$ is an aromatic hydrocarbon group having 6 to 15 carbon atoms.

The ester oil composing the mixed oil contains dipentaerythritol.

$R_1$ and $R_3$ in said formula (1) are one or more straight-chain alkyl groups selected from an n-docosyl group and an n-octadecyl group.

The lubricant composition of the present invention is sealed into the bearing of the present invention and in particular in a rolling bearing for use in a motor.

The urea compound shown by the formula (1) is added as the thickening agent to the base oil consisting of the synthetic hydrocarbon oil and the ester oil to form the lubricant composition of the present invention. The lubricant composition is sealed into the rolling bearing, for a motor of household appliances and apparatuses for industrial use, used at high temperatures and rotational speeds. Therefore the rolling bearing satisfies all the necessary characteristics of having a high degree of quietness, an excellent durability at high temperatures and rotational speeds, a low torque, and excellent fretting property.

DETAILED DESCRIPTION OF THE PREFERRED EMBODIMENTS

Figure 1:
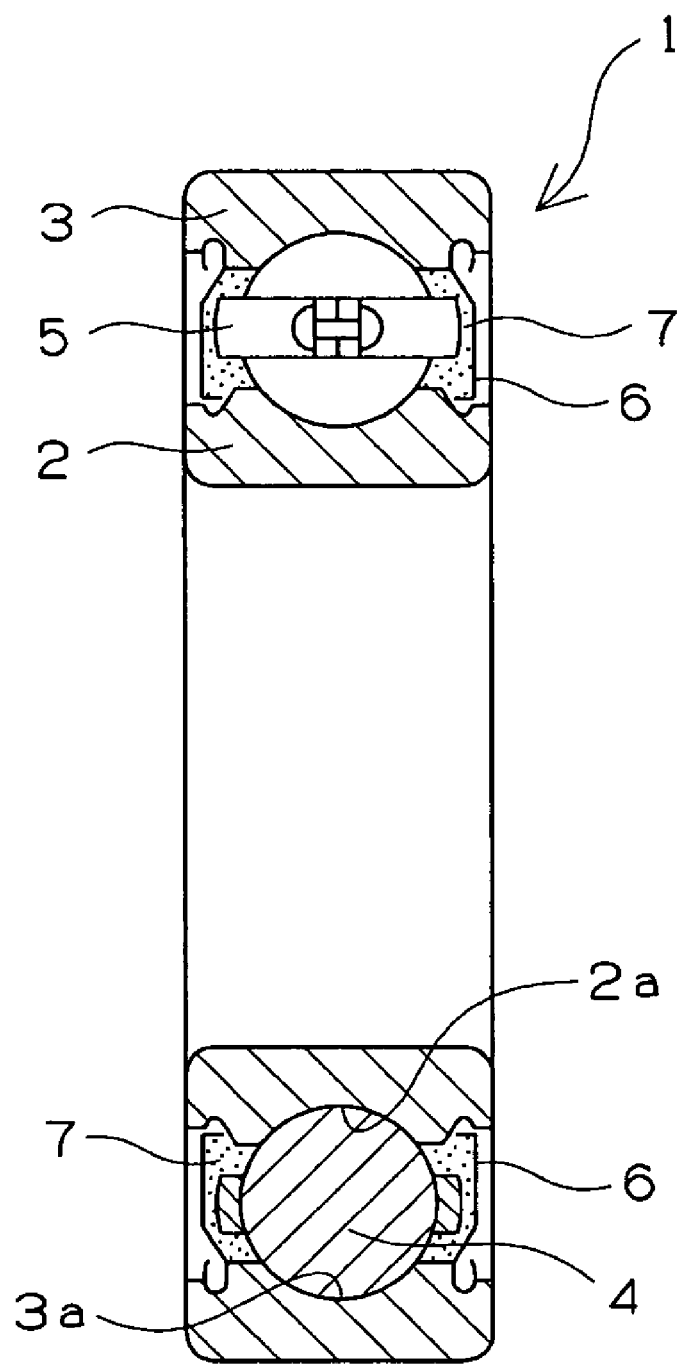
FIG. 1 is a sectional view showing a ball bearing having a small diameter.

The present inventors have examined the lubricant composition that allows the rolling bearing to satisfy all the necessary characteristics of having a high degree of quietness, an excellent durability at high temperatures and rotational speeds, a low torque, and excellent fretting property when the lubricant composition is sealed into rolling bearings, for motors of household appliances and apparatuses for industrial use, which are used at high temperatures and rotational speeds.

The present inventors have found that the use of thickening agents excellent in dispersibility improve the degree of quietness. The present inventors have found that owing to contribution of the straight-chain alkyl group of the urea compound shown by the formula (1), the urea compound shown by the formula (1) is more dispersible in a base oil consisting of a mixed oil of a synthetic hydrocarbon oil and an ester oil than other thickening agents excellent in the dispersibility in the base oil and that the use of the urea compound shown by the formula (1) improves the degree of the quietness of the rolling bearing.

The present inventors have examined the kind and characteristic of the base oil excellent in durability at high temperatures and rotational speeds. As a result, they have found that it is possible to improve the durability of the lubricant composition at high temperatures and rotational speeds to the highest extent by using the mixed oil, consisting of the synthetic hydrocarbon oil and the ester oil, having a specific kinematic viscosity characteristic and a specific mixing ratio. They have also found that it is possible to reduce the torque of the bearing and improve the fretting property of the lubricant composition by using the above-described mixed oil.

The torque of the bearing into which the lubricant composition is sealed is affected by the kinematic viscosity of the base oil. That is, the lower the kinematic viscosity of the base oil is, the lower the torque of the bearing is. On the other hand, when the viscosity of the base oil becomes too low, the durability of the lubricant composition at high temperatures and rotational speeds is liable to deteriorate. The present inventors have also found that when the base oil is combined with the urea compound shown by the formula (1), the lubricant composition allows the bearing to have a low torque and has an excellent durability at high temperatures and rotational speeds, when the kinematic viscosity of the base oil at 40° C. is 40 to 70 mm$^2$/second.

The present inventors have also found that the fretting property of the lubricant composition can be improved by adding at least 30 wt % of the synthetic hydrocarbon oil to the base oil.

As described above, the present inventors obtained the lubricant composition satisfying all the necessary characteristics of having a high degree of quietness, high durability at high temperatures and rotational speeds, a low torque, and excellent fretting property by using the mixed oil consisting of the synthetic hydrocarbon oil and the ester oil as the base oil and mixing the urea compound shown by the formula (1) serving as the thickening agent with the base oil. The present invention is based on this knowledge.

The base oil which can be used in the present invention satisfies the following conditions:
(a) The mixed oil consists of a synthetic hydrocarbon oil and an ester oil; (b) The kinematic viscosity of the mixed oil at 40° C. is 40 to 70 mm$^2$/second; (c) The mixing ratio by weight between the ester oil of the mixed oil and the synthetic hydrocarbon oil thereof is 30:70 to 70:30.

An aliphatic hydrocarbon oil is preferable as the synthetic hydrocarbon oil which can be used in the present invention. Poly-α-olefin oil and a copolymer of α-olefin oil and olefin are more favorable than other aliphatic hydrocarbon oils.

Each of these aliphatic hydrocarbon oils has a structure in which hydrogen is added to the terminal double bond of oligomer such as a low polymer of the α-olefin. Polybutene which is one of the poly-α-olefin can be also used. By using a catalyst such as aluminum chloride, the polybutene can be produced by polymerization from a starting material containing isobutylene as its main component. The polybutene can be used as it is or by adding hydrogen thereto.

The synthetic hydrocarbon oil is liquid at a room temperature. The kinematic viscosity of the synthetic hydrocarbon oil at 40° C. is not less than 40 mm$^2$/second. It is preferable that the kinematic viscosity of the synthetic hydrocarbon oil at 40° C. is not less than 40 mm$^2$/second nor more than 60 mm$^2$/second. If the kinematic viscosity of the synthetic hydrocarbon oil at 40° C. is less than 40 mm$^2$/second, the base oil deteriorates in a short period of time and a substance generated by the deterioration accelerates deterioration of the entire base oil. Thus the lubricant composition is inferior in its durability at high temperatures and rotational speeds.

The ester oil which can be used in the present invention is a compound which has ester groups in its molecule and is liquid at the room temperature. Aromatic ester oil and polyol ester oil can be used suitably.

As the aromatic ester oil, compounds prepared by reaction between aromatic polybasic acids or its derivatives and higher alcohol are listed. The following aromatic polybasic acids are preferable: aromatic tribasic acids such as trimellitic acid, biphenyltricarboxylic acid, and naphthalenetricarboxylic acid; aromatic tetrabasic acids such as pyromellitic acid, biphenyltetracarboxylic acid, benzophenonetetracarboxylic acid, and naphthalenetetracarboxylic acid; and derivatives such as acid anhydrides of these aromatic polybasic acid. As the higher alcohol, aliphatic monovalent alcohol such as octyl alcohol, decyl alcohol, and the like having not less than four carbon atoms are preferable. As the aromatic ester oil, trioctyl trimellitate, tridecyl trimellitate, and tetraoctyl pyromellitate are listed.

It is preferable that the polyol ester oil is a compound obtained by reaction between polyol and a monobasic acid and having a plurality of ester groups in its molecule. The monobasic acid that is reacted with the polyol may be used singly or as a mixture. A dibasic acid may be used for oligoester.

As the polyol, trimethylol propane, pentaerythritol, dipentaerythritol, neopentyl glycol, and 2-methyl-2-propyl-1,3-propanediol can be used.

As the monobasic acid, monovalent fatty acids having 4 to 18 carbon atoms can be used. The following monovalent fatty acids which can be used in the present invention include valerianic acid, caproic acid, caprylic acid, enanthic acid, pelargonic acid, capric acid, undecanoic acid, lauric acid, myristic acid, palmitic acid, beef tallow fatty acid, stearic acid, caprolenic acid, undecenoic acid, linderic acid, tsuzuic acid, physeteric acid, myristoleic acid, palmitoleic acid, petroselinic acid, oleic acid, elaidic acid, asclepinic acid, vaccenic acid, sorbic acid, linoleic acid, linolenic acid, sabinic acid, and ricinolic acid.

As the ester oil of the base oil which is used in combination with the urea compound shown by the formula (1), it is preferable that the ester oil is the dipentaerythritol ester formed by using dipentaerythritol as the polyol. As the acid, it is preferable to use the monovalent fatty acid having 4 to 18 carbon atoms. The use of the dipentaerythritol ester improves the durability of the lubricant composition at high temperatures.

The kinematic viscosity of the ester oil at 40° C. is not less than 30 mm$^2$/second and preferably not less than 40 nor more than 100 mm$^2$/second. If the kinematic viscosity of the ester oil at 40° C. is less than 30 mm$^2$/second, the base oil deteriorates in a short period of time and a substance generated by the deterioration accelerates deterioration of the entire base oil.

Thus the lubricant composition is inferior in its durability at high temperatures and rotational speeds.

The base oil that can be used in the present invention is the mixed oil of the synthetic hydrocarbon oil and the ester oil. The weight percentage of the ester oil for the entire mixed oil is in the range of 30 to 70 wt %. The kinematic viscosity of the mixed oil at 40° C. is not less than 40 mm²/second nor more than 70 mm²/second. If the weight percentage of the ester oil for the entire mixed oil is less than 30, the lubricant composition is inferior in its durability in the rotation of the bearing at high temperatures and high speeds. On the other hand, if the weight percentage of the ester oil for the entire mixed oil is more than 70, the lubricant composition has a deteriorated fretting property. If the kinematic viscosity of the mixed oil at 40° C. is more than 70 mm²/second, the lubricant composition causes the torque of the bearing to become higher.

The thickening agent that can be used in the present invention is a diurea-containing urea compound, shown by a formula (1) shown below, which becomes fine particles when it disperses in the base oil:

(1)

where $R_1$ and $R_3$ are straight-chain alkyl groups having 9 to 22 carbon atoms respectively, and $R_2$ is an aromatic hydrocarbon group having 6 to 15 carbon atoms.

The urea compound shown by the formula (1) is prepared by allowing reaction between aromatic diisocyanate compounds and straight-chain alkylamino compounds having 9 to 22 carbon atoms. As the aromatic diisocyanate compounds, the following compounds can be used: 1,5-naphthylene diisocyanate, 4,4'-diphenylmethane diisocyanate, 2,4-tolylene diisocyanate, 2,6-tolylene diisocyanate, and 3,3'-dimethyl-4,4'-biphenylene diisocyanate. As the straight-chain alkylamino compounds, the following compounds can be used: n-docosylamine, n-octynelamine, and n-icosylamine.

It is preferable to use an approximately equivalent amount of an isocyanate group of an isocyanate compound and an amino group of an amine compound so that a reactive free radical does not remain.

In adding the thickening agent to the base oil, the isocyanate compound and the amine compound may be reacted with each other in the base oil or the urea-containing thickening agent synthesized in advance may be mixed with the base oil. The former method is more favorable than the latter method because the former method keeps the obtained lubricant composition more stable than the latter method.

The mixing ratio of the urea compound is 5 to 20 wt % for the entire lubricant composition. If the mixing ratio of the urea compound is less than 5 wt % for the entire lubricant composition, the lubricant composition is liable to soften and leak. Thus it is difficult to seal the lubricant composition into the bearing. If the mixing ratio of the urea compound is more than 20 wt % for the entire lubricant composition, the lubricant composition becomes hard. Thus the lubricant composition cannot be practically used for the bearing by sealing the lubricant composition into the bearing.

The lubricant composition of the present invention may contain additives containing an antioxidant as necessary. It is preferable that the lubricant composition contains at least one antioxidant selected from an amine antioxidant and a sulfur-containing antioxidant.

The amine antioxidant improves the durability of the ester oil in particular at high temperatures and rotational speeds. The sulfur-containing antioxidant improves the durability of the synthetic hydrocarbon oil at high temperatures and rotational speeds. Therefore in the present invention, 0.1 to 3 wt % of the amine antioxidant and 0.1 to 3 wt % of the sulfur-containing antioxidant are respectively used for the antioxidant-excluded entire lubricant composition before the addition of both said antioxidants. Thereby the lubricant composition of the present invention is excellent in its durability at high temperatures and rotational speeds.

The following amine antioxidants can be used in the present invention: alkyldiphenylamines such as p,p'-dioctyl diphenylamine, N,N'-diisopropyl-p-phenylenediamine, N,N'-di-sec-butyl-p-phenylenediamine; phenyl-1-naphtylamine; phenyl-2-naphtylamine; diphenyl-p-phenylenediamine; dipyridylamine, and oleylamideamine.

The following sulfur-containing antioxidants can be used in the present invention: phenothiazine, N-methylphenothiazine, N-ethylphenothiazine, 3,7-dioctylphenothiazine, alkyldithiophosphoric acid metal salt, dilauryl thiodipropionate, distearyl thiodipropionate, dimyristyl thiodipropionate, and ditridecyl thiodipropionate.

To enhance the excellent performance of the lubricant composition of the present invention, it may contain other known additives as necessary: high-pressure agents containing chlorine, sulfur or phosphorous, and organic molybdenum; rust preventives such as petroleum sulfonate, dinonyl naphthalene sulfonate, and sorbitan ester; metal deactivators such as benzotriazole and sodium nitride; and viscosity index improving agents such as polymethacrylate, polyisobutylene, and polystyrene. The lubricant composition may contain these additives singly or in combination.

FIG. 1 shows an example of the bearing of the present invention into which the lubricant composition is sealed. FIG. 1 is a sectional view of a deep groove ball bearing.

A bearing 1 includes an inner ring 2 having an inner ring rolling surface 2a on its peripheral surface, an outer ring 3 concentric with the inner ring 2 and having an outer ring rolling surface 3a on its inner peripheral surface, and a plurality of rollers 4 disposed between the inner ring rolling surface 2a and the outer ring rolling surface 3a. The bearing 1 further includes a holder 5 holding the rollers 4 and a sealing member 6 fixed to the outer ring 3. A grease 7 for low and high temperature application is sealed on the periphery of the rollers 4.

The above-described lubricant composition is sealed into the bearing of the present invention. Therefore the bearing satisfies the above-described necessary characteristics. More specifically, the bearing has a high degree of quietness, a high durability at high temperatures and rotational speeds, a low torque, and excellent fretting property. Consequently the bearing of the present invention can be used as the bearing of a motor used for household appliances and apparatuses for industrial use.

Examples 1 Through 6 and Comparison Examples 1 Through 7

Each lubricant composition was prepared by using materials for the base oil and the thickening agent at the mixing ratios shown in table 1 and 2. As the ester oil 1 shown in tables 1 and 2, dipentaerythritol ester oil (commercial name: Hatcol H2362 produced by Nippon Steel Chemical Co., Ltd., kinematic viscosity at 40° C.: 70 mm²/second) was used. As the ester oil 2, polyol ester oil (commercial name: Kaolube 268 produced by Kao Inc., kinematic viscosity at 40° C.: 33 mm²/second) was used. As the synthetic hydrocarbon oils 1 and 2, Synfluid (produced by Nippon Steel Chemical Co., Ltd., kinematic viscosity of synthetic hydrocarbon oil 1 at 40° C.: 46 mm²/second, and kinematic viscosity of synthetic hydrocarbon oil 2 at 40° C.: 30 mm²/second) were used. As the synthetic hydrocarbon oil 3, SHF (produced by Exxon Mobil Corp., kinematic viscosity at 40° C.: 68 mm²/second) was used.

Diphenylmethane diisocyanate (MDI) was thermally dissolved in one half amount of the base oil. The amine shown in table 1 was thermally dissolved in the other half amount of the base oil. The amine-dissolved base oil was added to the diphenylmethane diisocyanate-dissolved base oil. The amount of the amine was twice as much as that of the diphenylmethane diisocyanate in a molar ratio. After a generated gel substance was stirred, it was supplied to a roll mill to obtain semi-solid lubricant grease as the lubricant composition.

Tables 1 and 2 show the measurement results of the worked penetration of each obtained lubricant composition and the viscosity of each base oil used. Tables 1 and 2 also show the results of the measurement of sound, the durability test at high temperatures and rotational speeds, the torque test, and the fretting test.

(1) Measurement of Sound

A rolling ball bearing (size of bearing: inner diameter was 8 mm, outer diameter was 22 mm, and width was 7 mm) into which the lubricant composition was sealed was prepared. The rolling ball bearing was rotated at 1800 rpm for 30 seconds with an axial load of 7.8N being applied thereto to measure a vibration value G (RMS value). Evaluations were made at three stages as described below. Results are shown in tables 1 and 2.

⊚: Vibration value is less than 25 mG.
○: Vibration value is not less than 25 mG and less than 30 mG.
x: Vibration value is not less than 30 mG.

(2) Durability Test at High Temperature and Speed

The lubricant composition was sealed in an amount of 0.7 g into the rolling bearing (size of bearing: inner diameter was 20 mm, outer diameter was 47 mm, and width was 14 mm). The rolling bearing was rotated at 10000 rpm at 150° C. on the periphery of the outer ring of the rolling bearing, with a radial load of 67N and an axial load of 67N being applied thereto. The period of time from the time when the durability test started until the rolling bearing had seizing was measured. Tables 1 and 2 show the test results.

(3) Test of Torque

The lubricant composition was sealed in an amount of 1.8 g into the rolling bearing (size of bearing: inner diameter was 20 mm, outer diameter was 47 mm, and width was 14 mm). The rolling bearing was rotated at 8000 rpm and at a room temperature with an axial load of 39.2N being applied thereto. The average value of the torque generated by the rolling bearing was computed 10 minutes after the rolling bearing started to rotate and evaluated at two stages as described below. Tables 1 and 2 show the test results.

○: Torque is less than $5\times10^{-2}$ Nm.
x: Torque is not less than $5\times10^{-2}$ Nm.

(4) Fretting Test

The lubricant composition was applied to the inside of a bearing 51204 (size of thrust ball bearing: inner diameter was 20 mm and outer diameter was 40 mm). The bearing was vibrated successively with an axial load of 2450 N being applied thereto for two hours at a frequency of 30 Hz, an oscillating angle of 12 degrees, and a room temperature. After the fretting test finished, abrasion-caused reduction in the weight of the bearing was measured to evaluate the fretting property thereof at three stages as described below: Tables 1 and 2 show the test results. The lubricant composition having a smaller value in the reduction of the weight is superior than the one having a larger value in the reduction thereof in resistance to the fretting thereof.

○: Abrasion loss is less than 2 mg.
Δ: Abrasion loss is not less than 2 mg and less than 3 mg.
x: Abrasion loss is not less than 3 mg.

TABLE 1

|  | Example | | | | | |
| --- | --- | --- | --- | --- | --- | --- |
|  | 1 | 2 | 3 | 4 | 5 | 6 |
| Component (parts by weight) | | | | | | |
| Base oil | | | | | | |
| Ester oil 1 | 60.9 | 43.5 | 43.5 | 26.1 | — | — |
| Ester oil 2 | — | — | — | — | 26.1 | 60.9 |
| Synthesized hydrocarbon oil 1 | 26.1 | 43.5 | — | — | 60.9 | — |
| Synthesized hydrocarbon oil 2 | — | — | 43.5 | — | — | — |
| Synthesized hydrocarbon oil 3 | — | — | — | 60.9 | — | 26.1 |
| Thickener | | | | | | |
| Amine | | | | | | |
| n-octyl amine | 5.9 | 5.1 | 3.3 | 6.1 | 4 | 4 |
| n-octadecyl amine | — | 2.7 | — | 1.4 | — | — |
| n-docosyl amine | 1.7 | — | 5.4 | — | 4.4 | 4.4 |
| Diisocyanate | | | | | | |
| MDI | 6.4 | 6.2 | 5.3 | 6.5 | 5.6 | 5.6 |
| Properties | | | | | | |
| Viscosity of base oil (40° C., mm²/s) | 60 | 51 | 42 | 68 | 41 | 58 |
| Worked penetration (JIS K2220) | 240 | 245 | 238 | 254 | 234 | 246 |
| Measurement of sound | ⊚ | ○ | ⊚ | ○ | ⊚ | ⊚ |
| High temperature and high speed test, h | 2600 | 2200 | 2000 | 1400 | 1200 | 1300 |
| Torque test | ○ | ○ | ○ | ○ | ○ | ○ |
| Fretting test | ○ | ○ | ○ | ○ | ○ | ○ |

TABLE 2

| | Comparison example | | | | | | |
|---|---|---|---|---|---|---|---|
| | 1 | 2 | 3 | 4 | 5 | 6 | 7 |
| Component (parts by weight) | | | | | | | |
| Base oil | | | | | | | |
| Ester oil 1 | — | — | 60.9 | — | — | 87 | 26.1 |
| Ester oil 2 | — | — | — | 86 | 42.5 | — | — |
| Synthesized hydrocarbon oil 1 | 85 | 85 | 26.1 | — | 42.5 | — | — |
| Synthesized hydrocarbon oil 2 | — | — | — | — | — | — | 60.9 |
| Synthesized hydrocarbon oil 3 | — | — | — | — | — | — | — |
| Thickener | | | | | | | |
| Amine | | | | | | | |
| n-octyl amine | 7.6 | 4.1 | 3.5 | 6.2 | 7.6 | 6.6 | 6.6 |
| Cyclo hexyl amine | — | 3.1 | 2.7 | — | — | — | — |
| Diisocyanate | | | | | | | |
| MDI | 7.4 | 7.8 | 6.8 | 7.8 | 7.4 | 6.4 | 6.4 |
| Properties | | | | | | | |
| Viscosity of base oil (40° C., mm²/s) | 46 | 46 | 60 | 33 | 36 | 72 | 38 |
| Worked penetration (JIS K2220) | 240 | 240 | 260 | 260 | 260 | 240 | 250 |
| Measurement of sound | ○ | X | X | ○ | ○ | ○ | ○ |
| High temperature and high speed test, h | 600 | 1500 | 2300 | 500 | 400 | 1600 | 800 |
| Torque test | ○ | ○ | ○ | ○ | ○ | X | ○ |
| Fretting test | ○ | ○ | ○ | X | ○ | X | ○ |

As shown in tables 1 and 2, all of the above-described necessary characteristics were satisfied by the lubricant composition of each of the embodiments containing the base oil, consisting of the mixed oil of the synthetic hydrocarbon oil and the ester oil, which had a specific feature and the urea compound added to the base oil shown in equation (1). More specifically, each lubricant composition had a high degree of quietness, a high durability at high temperatures and rotational speeds, a low torque, and excellent fretting property.

In the present invention, the base oil of the lubricant composition consists of the mixed oil of the synthetic hydrocarbon oil and the ester oil. The kinematic viscosity of the mixed oil at 40° C. is 40 to 70 mm²/sec. The mixing ratio by weight between the ester oil of the mixed oil and the synthetic hydrocarbon oil thereof is 30:70 to 70:30. The thickening agent is the urea compound shown by the specific formula (1). Consequently the bearing into which the lubricant composition is sealed has a high degree of quietness, an excellent durability at high temperatures and rotational speeds, a low torque, and excellent fretting property.

The bearing of the present invention into which the lubricant composition is sealed satisfies all the necessary characteristics of having a high degree of quietness, an excellent durability at high temperatures and rotational speeds, a low torque, and excellent fretting property.

What is claimed is:

1. A lubricant composition for use in a rolling bearing for a motor comprising a base oil and a thickening agent, wherein said base oil is a mixed oil having the following characteristics of (a) to (c):
   (a) said mixed oil consists essentially of a synthetic hydrocarbon oil and an ester oil;
   (b) a kinematic viscosity of said mixed oil at 40° C. is 40 to 70 mm²/second;
   (c) a mixing ratio by weight between said ester oil of said mixed oil and said synthetic hydrocarbon oil thereof is 30:70 to 70:30;
   said ester oil consists of a dipentaerythritol ester oil and has a kinematic viscosity at 40° C. of not less than 30 mm²/second; and
   said thickening agent comprises a diurea compound of formula (1)

$$R_1-NHCNH-R_2-NHCNH-R_3 \quad (1)$$

where $R_1$ and $R_3$ are each a n-octyl group or a n-docosyl group and at least one of $R_1$ and $R_3$ is a n-docosyl group, and $R_2$ is an aromatic hydrocarbon group having 6 to 15 carbon atoms, wherein a mixing ratio of said diurea compound to an entirety of said lubricant composition is 5 to 20 wt %.

2. A lubricant composition according to claim 1, wherein a kinematic viscosity of said synthetic hydrocarbon oil at 40° C. is not less than 40 mm²/second.

3. A lubricant composition according to claim 1, wherein said synthetic hydrocarbon oil is an aliphatic hydrocarbon oil.

4. A lubricant composition according to claim 1, wherein a monovalent acid having 4 to 18 carbon atoms is used in forming said dipentaerythritol ester oil.

5. A lubricant composition according to claim 1, wherein 0.1 to 3 wt % of an amine antioxidant and 0.1 to 3 wt % of a sulfur-containing antioxidant are respectively added to said lubricant composition.

6. A method of lubricating a motor bearing which comprises applying a lubricant composition according to claim 1 to a motor bearing.

7. A sealed bearing into which a lubricant composition according to claim 1 is sealed, wherein said sealed bearing is used as a rolling bearing for a motor.

8. A lubricant composition for use in a rolling bearing for a motor comprising a base oil and a thickening agent, wherein said base oil is a mixed oil having the following characteristics of (a) to (c):
(a) said mixed oil consists essentially of a synthetic hydrocarbon oil and an ester oil;
(b) a kinematic viscosity of said mixed oil at 40° C. is 40 to 70 mm²/second;
(c) a mixing ratio by weight between said ester oil of said mixed oil and said synthetic hydrocarbon oil thereof is 30:70 to 70:30;
said ester oil being selected from the group consisting of a dipentaerythritol ester oil and has a kinematic viscosity at 40° C. of not less that 30 mm²/second; and
said thickening agent comprises a diurea compound of formula (I)

where $R_1$ and $R_3$ are each a n-octyl group or a n-octadecyl group and at least one of $R_1$ and $R_3$ is a n-octadecyl group, and $R_2$ is an aromatic hydrocarbon group having 6 to 15 carbon atoms, wherein a mixing ratio said diurea compound to an entirety of said lubricant composition is 5 to 20 wt %.

9. A lubricant composition according to claim 8, wherein a kinematic viscosity of said synthetic hydrocarbon oil at 40° C. is not less than 40 mm²/second.

10. A lubricant composition according to claim 8, wherein said synthetic hydrocarbon oil is an aliphatic hydrocarbon oil.

11. A lubricant composition according to claim 8, wherein a monovalent acid having 4 to 18 carbon atoms is used in forming said dipentaerythritol ester oil.

12. A lubricant composition according to claim 8, wherein 0.1 to 3 wt % of an amine antioxidant and 0.1 to 3 wt % of a sulfur containing antioxidant are respectively added to said lubricant composition.

13. A method of lubricating a motor bearing which comprises applying a lubricant composition according to claim 8 to a motor bearing.

14. A sealed bearing into which a lubricant composition according to claim 8 is sealed, wherein said sealed bearing is used as a rolling bearing for a motor.

* * * * *